July 31, 1945.　　　　I. D. FENWICK　　　　2,380,740
COLOSTOMY PAN
Filed July 2, 1942
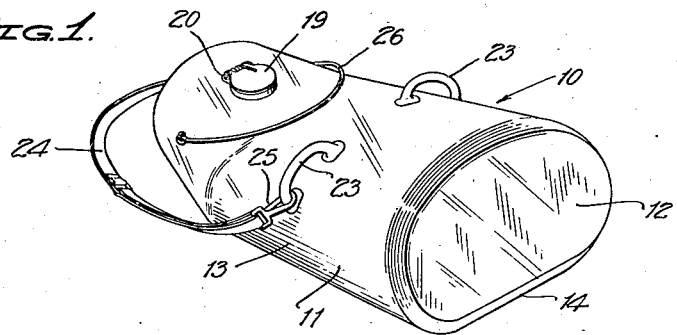
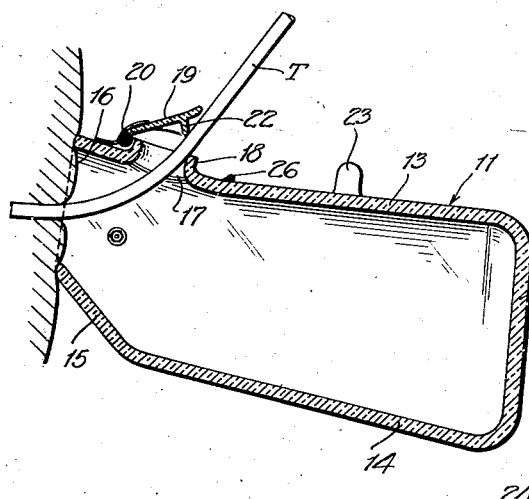
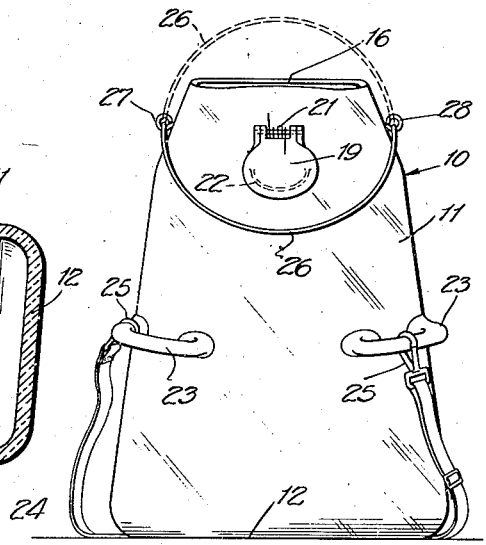
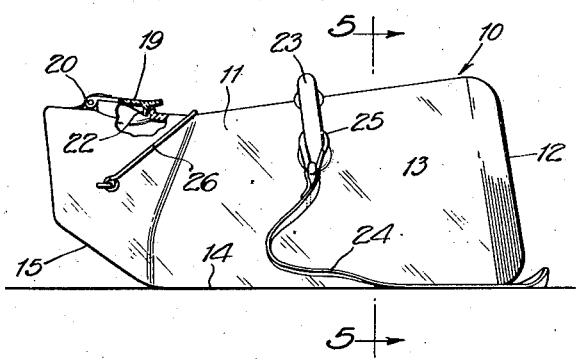
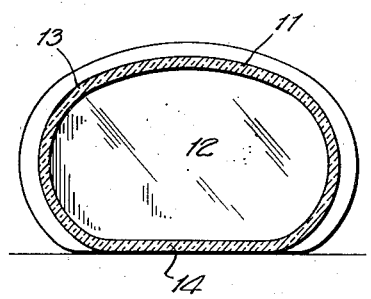
INVENTOR.
IVY D. FENWICK.
BY Ely & Pattison
ATTORNEYS.
WITNESS:

Patented July 31, 1945

2,380,740

UNITED STATES PATENT OFFICE 2,380,740

COLOSTOMY PAN

Ivy D. Fenwick, Brooklyn, N. Y.

Application July 2, 1942, Serial No. 449,435

2 Claims. (Cl. 128—283)

This invention relates to irrigating pans and more specifically to a colostomy pan.

The primary object of the invention resides in a colostomy pan for use in the giving of colostomy irrigations. The pan is constructed to give comfort to colostomy cases during hospitalization and for subsequent home use, and may be conveniently handled by the user in private, thus dispensing with the help of an attendant.

Other features of the invention are to provide a colostomy pan which is light in weight so as to be supported in comfort upon one's lap when in a natural sitting position; to provide means for the passage of an irrigation tube to the colostomy when the pan is adjusted thereover; to provide means for preventing the splashing and spilling of the fluids during expelling of the same from the colostomy into the pan; and to provide for the easy and thorough cleansing of the pan after use thereof for sanitary purposes.

Other features of the invention will appear as the following specification is read in conjunction with the accompanying drawing, in which:

Figure 1 is a perspective view of a colostomy pan constructed in accordance with the invention.

Figure 2 is a vertical sectional view of the colostomy pan positioned against the body and over the colostomy of a user, with an enema tube extending through the pan and into the colostomy.

Figure 3 is a side elevational view of the colostomy pan resting upon its flat bottom and showing the bail handle in lowered position in full lines and in raised position in dot and dash lines.

Figure 4 is a side elevational view of the colostomy pan resting upon its flat side.

Figure 5 is a vertical transverse sectional view on the line 5—5 of Figure 4.

Referring to the drawing by reference characters, the numeral 10 designates a colostomy pan constructed in accordance with the invention and which includes a receptacle body 11 having a flat bottom wall 12, a substantially oval side wall 13, except, for a flattened portion 14, which portion extends from the bottom wall and joins with an angular wall portion 15 disposed at the open end 16. The side walls of the body converge toward the open end, and said open end of the receptacle body 11 is therefore reduced in size and is disposed at an angle relative to the remaining portion. Whereas the body 11 may be made of metal, enamel, or the like, I prefer to make the same of a transparent glass or plastic substance for reasons to be hereinafter explained. All inner corners are rounded to facilitate thorough cleaning and the free edges of the open end of the body are likewise rounded to prevent cutting or uncomfortable contact of the open end of the body with the skin in the region of the colostomy when the pan is in use.

When the pan 10 is not in use, it rests upon the flat bottom wall 12 as shown in Figure 3, but when in use, the pan is held in a substantially horizontal position with the flat side 14 down as best seen in Figure 2. That side of the body 11 opposite to the flat side 14 is provided with an enema tube opening 17 which is of a size to freely permit an enema tube T (Figure 2) to pass therethrough and which is disposed adjacent the open end 16. The opening 17 is surrounded by an outwardly extending flange 18 which acts as a seat for a flat closure member 19, the same being pivoted as at 20 at that side of the opening 17 nearest the open end 16. A spring 21 acts upon the closure member 19 to normally seat the same upon the flange 18 to close the opening 18, and to hold the closure member against the tube T. An arcuate shape splash guard flange 22 extends inwardly from the closure member 19 to prevent splashing of the fluid through the opening during use of the pan while the closure member is in the partially open position or closed position.

Formed integral with the receptacle body 11 are a pair of spaced hand grips 23, the same being located at a point intermediate the end of the body and on that side opposite to the flat side portion 14. Whereas the hand grips 23 are grasped by the hands of a user to hold the open end 16 of the body 11 tightly against the abdomen and over the colostomy, I provide an adjustable waist encircling strap 24 to prevent accidental slipping of the pan from the lap of the user. The ends of the strap 24 are provided with snap hooks 25 which engage the respective hand grips 23. Both of the snap hooks 25 are detachable from the hand grips to facilitate the connection and disconnection of the strap with the waist region of the user.

To facilitate carrying of the receptacle body 11, I provide a bail handle 26 having its ends pivoted to opposed eyes 27 which are fastened to and extend from the body 11 adjacent the open end thereof. The bail handle 26 may be swung to an out-of-the-way position as shown in full lines in Figures 3 and 4 or to a position of use as shown in dotted lines in Figure 3.

In the treatment of colostomy cases, the pan 10 may be used while the patient is hospitalized or at home with the patient in a prone position or in a natural sitting position. If the patient is confined to bed, the nurse or attendant turns the patient to one side and to a position adjacent the side edge of the bed. The proper amount of irrigation solution is placed in the elevated bag of an irrigating apparatus, and the pan 10 is placed with its flat side 14 upon a chair or stand adjacent the bed. The rectal tube end T of the irrigating apparatus is inserted through the opening 17 and is passed through the open mouth 16 and is thence inserted into the colostomy. The pan 10 may now be pushed against the patient's body with the open end 16 disposed over the colostomy to seal the same thereagainst. The solution in the irrigating apparatus is released, after which the rectal tube end T thereof is withdrawn from the colostomy and the pan, whereupon the spring pressed closure member 19 swings down to closed position over the opening 17. The patient may if able, hold the pan against his or her body by grasping one or both of the hand grips 23 until the enema has been expelled from the colostomy into the pan, after which the attendant may remove the pan from the patient and proceed to empty and cleanse the same. Thus the enema operation has been performed to the comfort of the patient and without soiling of bed garments, linen, or attendant.

For home use, the user may prepare the irrigating apparatus in the privacy of his or her toilet and personally assume a sitting position with the flat side 14 of the pan 10 resting upon the knees with the strap 24 fastened about the waist. Preparatory to fastening of the strap, the irrigating tube T is inserted through the opening 17, open mouth 16, and into the colostomy. The user grasps both hand grips 23 to hold the open end 16 of the pan tight against the body and over the colostomy. The irrigating fluid may now be released, the tube removed, and the enema expelled into the pan without fear of soiling the surroundings.

The user may now unfasten the strap 24, lift the pan by the handle 26, and proceed to empty and cleanse the same.

The pan 10 is preferably made of transparent glass or plastic to enable the user to see the amount of irrigation expelled, which is essential to know before removing the pan from the colostomy. Also, the same is provided with rounded corners to facilitate cleansing of the pan. The open mouth 16 is made relatively large to enable the insertion of the hand for cleansing and to prevent the edges of the mouth opening from pressing too close to the area of the colostomy. Also, when traveling, the owner may compactly pack the irrigating apparatus and other essentials into the pan and provide a neat and convenient package.

Whereas the pan 10 has been referred to as a colostomy pan, the same may be used for other irrigating purposes, such as for deeply infected wounds in which drainage tubes may be lead from the wound to the pan through the opening 17.

While I have shown and described what I consider to be the preferred embodiment of my invention, I wish it to be understood that such changes in construction, design, and materials may be resorted to if desired without departing from the spirit of the invention as set forth in the appended claims.

Having thus described the invention, what I claim as new and desire to secure by Letters Patent, is:

1. A colostomy pan for use in the administering of an enema to a colostomy patient comprising an elongated receptacle body having an open mouth at one end thereof, the open mouth being of a size to enable the edges thereof to surround a colostomy when the pan is placed in a substantially horizontal position in use, that portion of the side wall of the receptacle body disposed face up when the pan is in use having an enema tube opening therein disposed adjacent the open mouth whereby a flexible enema tube may be freely passed through the enema tube opening into the interior of the receptacle body and thence through the open mouth into a colostomy, said receptacle body adapted to directly receive the discharge from the colostomy upon withdrawal of the enema tube therefrom.

2. A colostomy pan as set forth in claim 1 including a pair of spaced transversely alined hand grips provided on that side wall portion of the receptacle body which is disposed face up when the pan is in use to enable the user to grasp the same and hold the pan in position of use.

IVY D. FENWICK.